April 2, 1968      W. H. SIMON      3,375,573

METHOD AND APPARATUS FOR WELDING

Filed Oct. 22, 1965

INVENTOR.

United States Patent Office 3,375,573
Patented Apr. 2, 1968

3,375,573
METHOD AND APPARATUS FOR WELDING
Warner H. Simon, 6511 Comanche Ave.,
Canoga Park, Calif. 91306
Filed Oct. 22, 1965, Ser. No. 501,197
5 Claims. (Cl. 29—593)

This invention relates to a method and apparatus for the handling of electronic components under controlled environmental conditions before welding to reduce contamination. More particularly, the invention relates to a method and apparatus for transporting oxygen free high conductivity electronic component leads to the appropriate welding station under contamination-free environmental conditions.

In critical welding of electronic components, resistance welding has obvious advantages over other types of welding in that the materials to be welded are free from the introduction therebetween of extraneous welding materials. Resistatnce welding also is faster and assures localized heating that will not damage the component itself. Unfortunately, the leads of components that are to be resistance welded are themselves contaminated by oxides or are covered with an oxide resistive coating which itself becomes the contaminant. Other sources of contaminants are the result of uncontrolled storage, deposition of organic substances, and frequent handling etc. Attempting to remove the coating and other organic contaminants cannot be done uniformly and consistently, thus precluding resistance welds of consistently high quality. Furthermore, the removal of the protective coating is impractical, requires additional effort, and may add additional contamination, making such a step undesirable.

Particularly in spot welding electronic components, extreme cleanliness is necessary, as even slight surface contamination can produce considerable inconsistencies of spot weld properties. Therefore, the preferred welding process in conjunction with this invention consists of surrounding the spot welding electrodes and welding area with an inert gas such as argon or helium.

In accordance with the present invention a higher quality of resistance welds can be obtained through the use of component leads which are of an oxygen-free high conductivity uncoated material, such as copper or nickel.

It has been determined that electronic materials such as copper and nickel must be internally and externally free from elements which tend to contaminate the weld. Internal metallurgical cleanliness is achieved by reducing the contents of not only the elements phosphorus and sulfur but also the interstitial gases such as oxygen and hydrogen. At the present state of the art, copper and nickel have the following compositions:

Copper: Percent
Cu-Ag _____(min.)__ 99.9
O _____(max.)__ 0.015
P _____(max.)__ 0.015
S _____(max.)__ 0.100

Nickel:
Ni _____(min.)__ 99.5
C _____ 0.050
S _____ 0.005
O _____ Unspecified

The preferred compositions in conjunction with my invention are as follows:

Copper: Percent
Cu _____(min.)__ 99.99
O _____(max.)__ 0.001
P _____(max.)__ 0.0003
S _____(max.)__ 0.0020

Nickel: Percent
Ni _____(min.)__ 99.98
O _____(max.)__ 0.02
S _____(max.)__ 0.001
O _____(max.)__ 0.001

Further, in accordance with the present invention electronic components such as resistors, capacitors, or diodes are packaged in a hermetically sealed container where they are protected until they are ready for the resistance welding operation. These components in such a container have long contamination-free shelf life and controlled storage, and at the appropriate time are dispensed into humidity controlled medium such as inert gas for transportation to the welding work station.

It is therefore an objective of the present invention to provide for environmental control of high quality component leads which are to be subjected to resistance welding.

Another object is the provision of a method and apparatus for containing electronic component leads in a controlled contamination-free environment.

Another object is the provision of a method and apparatus for transporting electronic leads from an hermetically sealed contamination free container to a resistance welding work station in a contamination free environment.

Another object is the provision of a means for annealing the end of a lead of an electronic component to thereby obtain a more uniform reluctance reading.

Another object is the provision of a means for annealing the lead of an electronic component without causing oxidation thereof.

Another object is the provision of a means for obtaining a reluctance reading to positively identify the leads of an electronic component while in a contamination-free environment.

A further object of my invention is to obtain copper and nickel which is internally and externally free from residuals contaminants as well as interstitial gases, thereby providing more reliable welded joints between copper and nickel.

These and other objects will become more apparent as a detailed description of the invention proceeds, now having reference to the drawings wherein.

Figure 1:
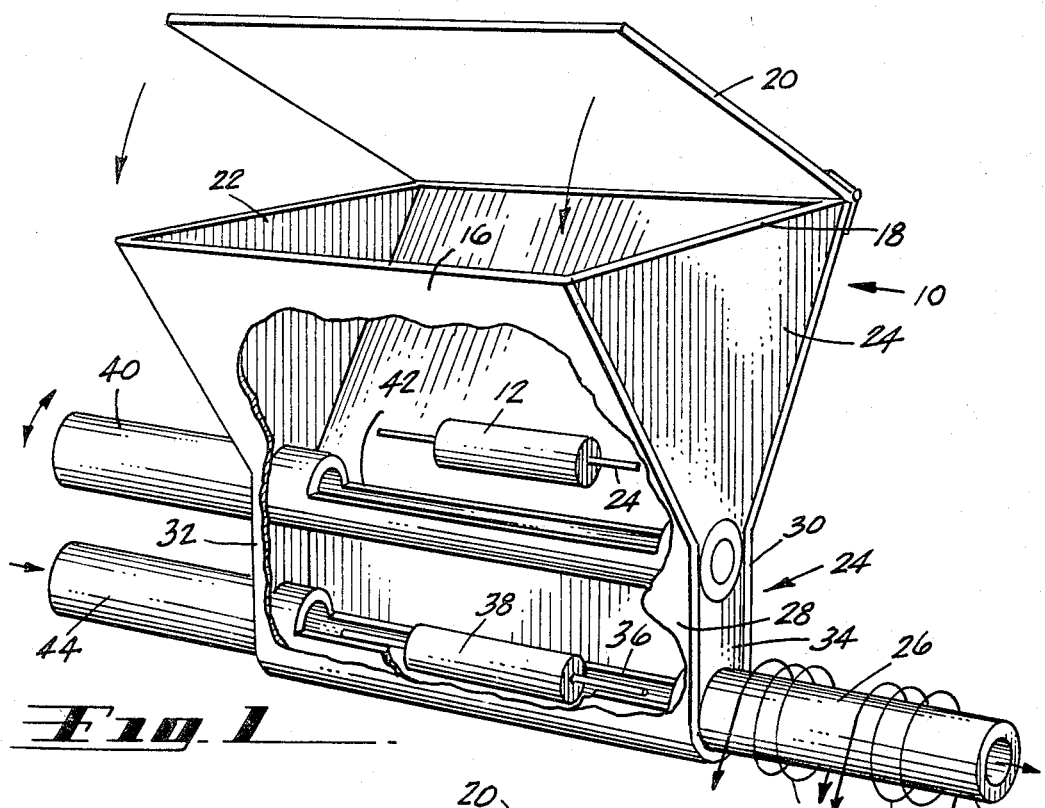
FIGURE 1 is a perspective view showing a component storage container.

Referring to FIGURE 1, there is shown in perspective a container 10 in which are placed a plurality of electronic components, in this case resistors, 12. These resistors have leads 14, of oxygen-free high-conductivity uncoated copper. The package is trough-shaped, consisting of a pair of inwardly tapered sides 16, 18, an hermetically sealed lid 20, and ends 32, 34. The converging sides 16 and 18 terminate in spaced relation to thereby provide a slot through which the resistors may drop by gravity feed. Extending below this slot is a connector housing 24 interconnecting the container 10 to a cylindrical conductor 26. The connector housing consists of side walls 28, 30 and end walls 32, 34. Cylindrical conductor 26 has an opening 36, communicating with the connector housing 24 in such a manner that the resistors 12 in the package 10, upon passing through the slot in the bottom of container, drop through the connector housing 24, through the conductor opening 36, and into the conductor 26 to the position shown by resistor 38.

To control the rate of passage of the components down into the cylindrical conductor 26, a control mechanism 40 is provided. This consists of a tube fitted for rotation in the ends 30 and 32 of connector housing 24. This mechanism has a cooperating slot 42, into which the resistor 12 will drop when slot 42 is in the uppermost position. Upon rotation of the mechanism 40, so that the slot 42 is in its downwardmost position, the resistor 12 then drops through the connector housing 24 and into the cylindrical conductor 26. Cylindrical conductor 26 normally is sealed at both ends during storage and shipment to its ultimate place of use, where it is then connected to a source of inert gas such as argon or nitrogen, or to a source of air of specified moisture content. In use, end 44 may be connected to the gas supply which, because of the gas pressure, will reject resistor 38 out of the tube at end 46. This end may then be connected to further conductors for passage to a work station.

Positioned over end 46 are two coils 48 and 50. Coil 48 is an induction coil for the purpose of annealing the end of a lead that is within the tube at that point. This permits the annealing of the lead while in inert gas environment, thus preventing oxidation that normally occurs during annealing. The purpose of annealing is to provide for a more uniform reluctance reading when the lead is positioned at the point of the reluctance coil 50. Reluctance coil 50 may be connected to a metallic comparator, not shown, for the purpose of determining the computation of the lead. Metallic comparators of this type are well known, one such comparator being manufactured by the Apollo Instruments Inc. in Gardena, Calif. as Model L1–1832. Such a metallic comparator permits inspection while the component is still within a contamination-free, controlled environment. The metallic comparator is the subject matter of another patent application and forms no part of the present invention except in combination therewith.

Figure 2:
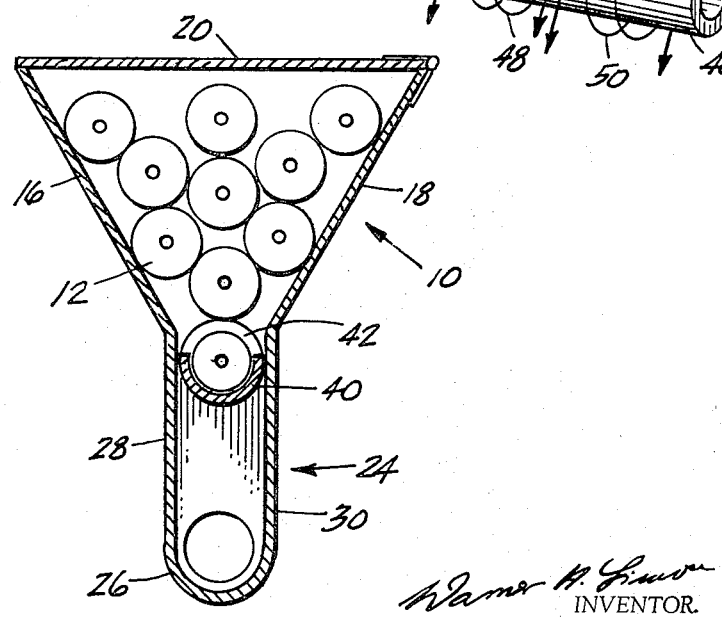
FIGURE 2 is an elevational end view in section.

FIGURE 2 is an elevational end view in cross-section to more clearly show the operation of the package 10 in the feeding of electronic components 12 to the conductor 26 for passage to the welding work station. Here again are shown inwardly diverging walls 16, 18, hermetically sealed top 20, and the space at the bottom of this package 10 through which the components 12 may pass. Control mechanism 40 fits into this space to receive the individual components. Upon rotation of this control mechanism 40 to cause slot 42 to extend downwardly, the component contained therein falls, due to gravity, through the connector 24 and into the cylindrical conductor 26. Side walls 28 and 30 of the connector 24 maintain the inside under an environmental controlled condition to thus prevent any oxidation or contamination of the component lead.

Having thus described a preferred embodiment in which the principles of the present invention are used, it is to be understood that this invention is not limited thereto but should be given the broadest possible construction as defined by the appended claims and that any modifications or alterations in the foregoing described embodiment are to be considered as part of the invention thus defined, it being anticipated that other variations are readily apparent by those skilled in the art.

What is claimed is:
1. The method of handling electronic components having leads adapted for resistance welding in an electronic circuit, said method comprising:
   packaging said components in hermetically sealed contamination free environment,
   individually removing components as desired under environmental controlled conditions, and
   placing said components in a pressurized conductor for passage to a welding work station.
2. The method as in claim 1 wherein an inert gas is passed through said conductor for moving said component therethrough in a contamination free environment.

3. The method of handling components having leads adapted for resistance welding in an electronic circuit, said method comprising:
   storing said components in a contamination free environment until use is desired,
   individually placing said components in a conductor having an inert gas passing therethrough for passage to a welding work station,
   annealing said leads while in said conductor to thereby prevent oxidation thereof, and to permit a more uniform reluctance reading, and
   subjecting said leads with said conductor to a reluctance measuring device to determine the composition of said leads.

4. Apparatus for handling electronic components having oxygen-free high-conductivity uncoated leads comprising:
   an hermetically sealable container for storing a plurality of said components therein,
   means for ejecting individual components as needed, said means including a connector housing, a control mechanism within said housing for receiving individual components therein, said mechanism upon actuation being operable to eject the component therein,
   a conductor having an inert gas passing therethrough, said connector housing being attached to said conductor in such manner as to deposit ejected components therein, said inert gas moving said components to a welding work station, said conductor having a section with annealing means thereon for annealing said components leads in an inert gas environment.

5. Apparatus for handling components having oxygen-free high-conductivity uncoated leads comprising:
   an hermetically sealable container for storing a plurality of said components therein,
   means for ejecting individual components as needed, said means including a connector housing, a control mechanism within said housing for receiving individual components therein, said mechanism upon actuation being operable to eject the component therein,
   a conductor having an inert gas passing therethrough, said connector housing being attached to said conductor in such manner as to deposit ejected components therein, said inert gas moving said components to a welding work station,
   said conductor having a section with annealing means thereon for annealing said components leads in an inert gas environment,
   said conductor having a section with a reluctance coil thereon from which reluctance readings may be taken.

References Cited
UNITED STATES PATENTS

| | | | |
|---|---|---|---|
| 1,103,358 | 7/1914 | Hess | 148—129 |
| 1,165,700 | 12/1915 | Muessel | 221—278 |
| 1,697,811 | 1/1929 | Dailey | 148—129 |
| 1,779,604 | 10/1930 | Knerr | 148—129 |
| 1,808,241 | 6/1931 | Martin | 148—129 |
| 2,018,992 | 10/1935 | Bohmer | 221—1 X |
| 2,074,269 | 3/1937 | O'Donnell | 221—135 |
| 2,151,993 | 3/1939 | Sears | 221—266 X |
| 2,840,265 | 6/1958 | Noyes | 221—13 X |
| 2,937,787 | 5/1960 | Taylor et al. | 221—135 X |
| 2,961,046 | 11/1960 | Moeller et al. | 221—278 X |
| 3,039,531 | 6/1962 | Scott | 221—278 X |

SAMUEL F. COLEMAN, *Primary Examiner.*